Nov. 10, 1964 D. D. PETTIGREW 3,156,127
VIBRATION REDUCING DEVICE AND METHOD
Filed Aug. 2, 1962 2 Sheets-Sheet 1
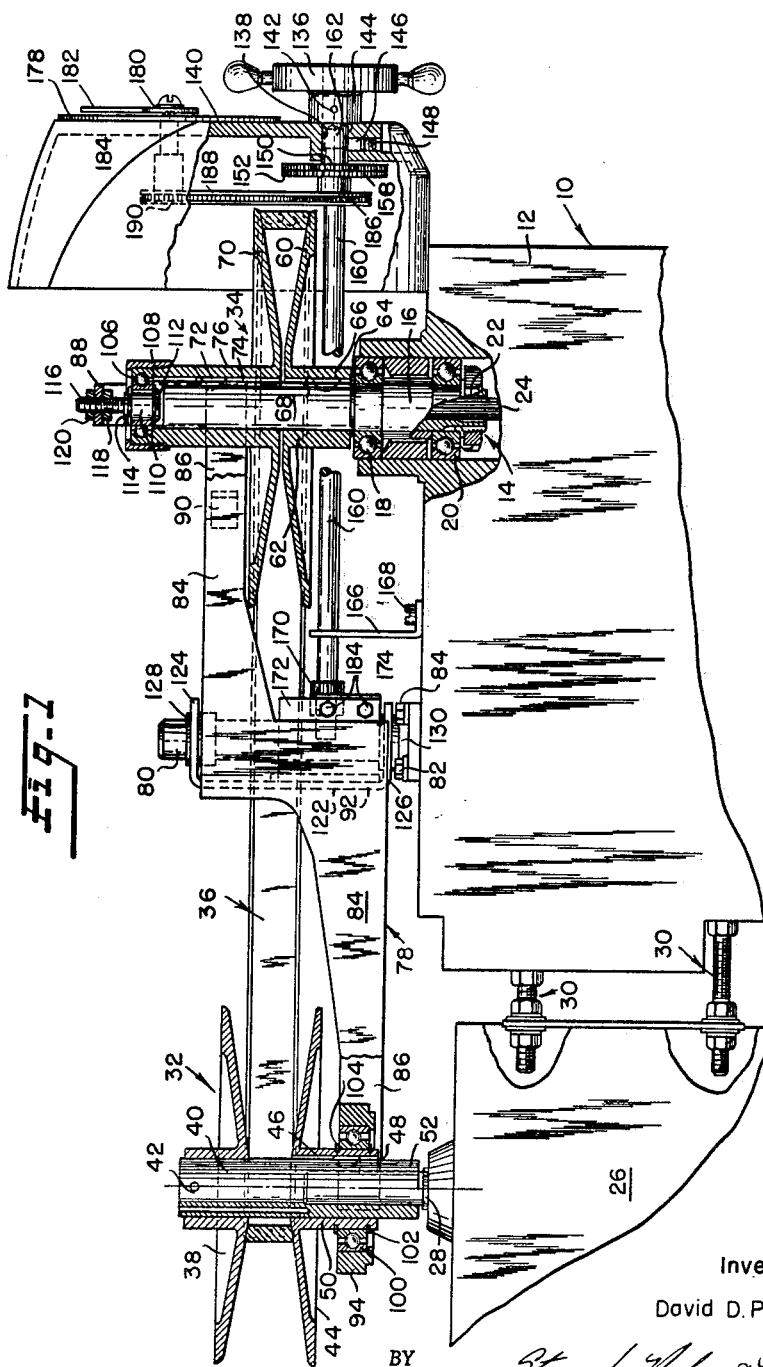
Inventor
David D. Pettigrew
BY
Strauch, Nolan & Neale
ATTORNEYS

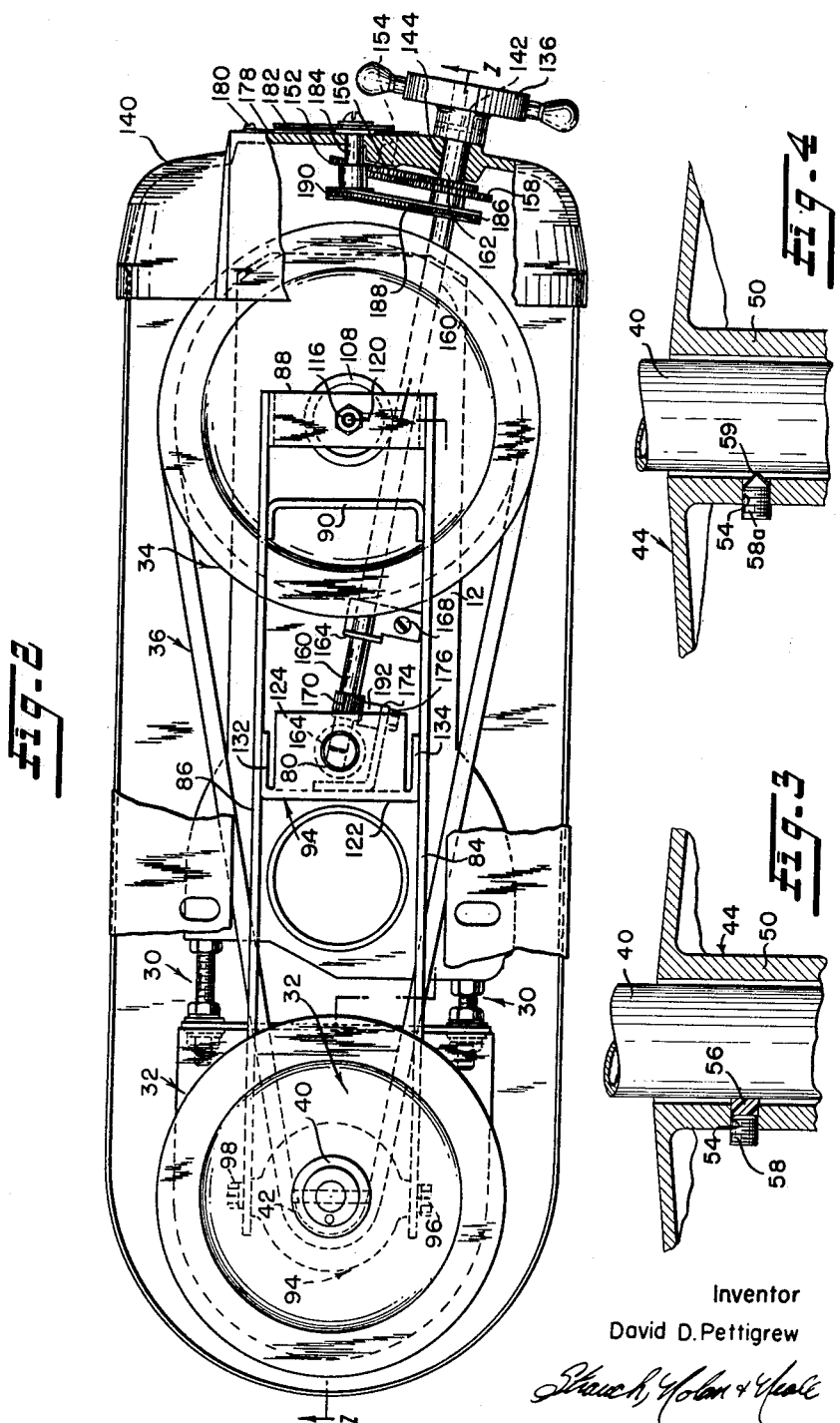

United States Patent Office 3,156,127
Patented Nov. 10, 1964

3,156,127
VIBRATION REDUCING DEVICE AND METHOD
David D. Pettigrew, Pittsburgh, Pa., assignor to Rockwell Manufacturing Company, Pittsburgh, Pa., a corporation of Pennsylvania
Filed Aug. 2, 1962, Ser. No. 214,226
8 Claims. (Cl. 74—230.17)

This invention relates to vibration reducing devices and methods and, more specifically, to devices and methods for eliminating chattering between two rotatively fixed rotary members, one of which is freely slidable on the other, without impeding the sliding movement. The present invention is especially useful in minimizing the operating noise of variable speed belt drives by eliminating chattering between the drive pulley and drive shaft although it is by no means limited to this application.

Conventional variable speed belt drives, such as those shown in United States Patent No. 2,233,822, issued to W. Schubbe March 4, 1941, for "Drilling Machine" and in United States Patent No. 2,604,794 issued to F. B. Scott July 29, 1952, for "Belt Tensioning Device for Variable-Speed Drives," include driving and driven pulleys mounted on rotatable shafts and connected by an endless belt, generally of the V-type. Each of the pulleys has a pulley half which is axially and rotatively fixed to the associated shaft and a pulley half rotatively fixed to the shaft, but freely movable or slidable along it. The movable pulley halves are connected by a speed varying mechanism which simultaneously varies the effective diameters of the two pulleys in equal amounts, but in the opposite sense, by shifting the respective movable pulley halves toward and away from the associated fixed pulley halves.

Variable speed drives of this type have heretofore been plagued by noisy operation, caused mainly by chattering of the drive pulley on the drive shaft, especially at low speeds. The present invention eliminates this problem, providing quietly operating variable speed belt drives. Broadly speaking, the present invention, as it relates to the particular type of belt drive described above, resides in fixing a resilient insert having a low coefficient of friction between the movable half of the drive pulley and the drive shaft. It has been found that, surprisingly, this eliminates the chattering without restricting the movement of the pulley half along the drive shaft.

It is an object of the present invention to provide novel means and methods for eliminating chattering between two rotatively fixed, rotatable members in a variable speed belt drive, one of which is freely slidable on the other, without impeding the sliding movement.

Another specific object of the present invention resides in the provision of quietly operating variable speed belt drives.

Another specific object of the present invention is the provision of novel methods for substantially eliminating the operating noise of variable speed belt drives.

Yet another specific object of the present invention resides in the provision of novel means and methods for preventing drive pulleys of variable speed belt drives from chattering without impeding the shifting of the movable drive pulley half along the drive shaft.

Additional objects and further novel features of the present invention will become fully apparent from the appended claims and as the ensuing detailed description and discussion proceeds in conjunction with the accompanying drawing, in which:

FIGURE 1 is a side view, partly in section, of a drill head equipped with a variable speed, V-belt drive incorporating the present invention;

FIGURE 2 is a top plan view of the structure illustrated in FIGURE 1;

FIGURE 3 is a side view, partly in section and to an enlarged scale, of the drive shaft and a portion of the drive pulley constructed in accordance with the present invention; and FIGURE 4 is a modified form of the present invention.

As was pointed out above, the present invention may be advantageously employed to substantially eliminate the operating noise of variable speed belt drives. In the following detailed description and discussion the present invention will, therefore, be described in relation to such a belt drive, the particular drive or transmission illustrated being that disclosed and claimed in copending application Serial No. 162,847 filed March 1, 1962, by J. H. Diehl et al. for "Power Tool and Transmission Therefor" and assigned to the assignee of the present invention. It is to be understood, however, that not only is the usefulness of the present invention not limited to the particular belt drive illustrated, but that it has utility in other such transmissions where it is desired to prevent chattering between two rotatively fixed rotary members and, at the same time, permit free sliding movement of one member upon the other.

Referring now to the drawing, FIGURE 1 illustrates the head 10 of a drill press of the general form illustrated in United States Patent No. 2,567,982 issued September 18, 1951 to C. A. Wiken for "Machine Tool," and equipped with a variable speed belt drive incorporating the present invention. Drill head 10 comprises a head casting or body member 12. The drill spindle 14 includes an upper spindle portion 16 journalled in casting 12 by axially spaced anti-friction bearings 18 and 20 and a coaxial, lower spindle portion 22 mounted on the casting by a quill (not shown) in the conventional manner and connected to the upper spindle portion by splines 24. An electric drive motor 26 with an output shaft 28 substantially parallel to the axis of the spindle 14 is secured to casting 12 by mounting studs 30 in the conventional manner.

Motor output shaft 28 is drive-connected to spindle 14 by a variable speed V-belt drive comprising a split sheave pulley 32 mounted on the motor output shaft, a split sheave pulley 34 mounted on upper spindle portion 16, and a V-belt 36 interconnecting pulleys 32 and 34.

Pulley 32 comprises an upper sheave half 38 rotatively and axially fixed to a sleeve 40 by dowel pin 42, a movable sheave half 44 slidably mounted on sleeve 40 and rotatively fixed thereto by a key 46 which is secured to sleeve 40 and engages an axially extending keyway 48 within the bore of movable sheave half hub 50. Sleeve 40 is slidably fixed on motor output shaft 28 by a setscrew 52.

Referring now especially to FIGURE 3, a transversely extending internally threaded aperture 54 is formed through movable sheave half hub 50. Disposed in aperture 54 is a vibration absorbing insert 56 which is retained in place by a setscrew 58 threaded into aperture 54, at least the outer portion of which is internally threaded to retain the setscrew in place. Setscrew 58 is tightened against insert 56 which, preferably, has substantially the same diameter as aperture 54.

The particular material from which vibration absorbing insert 56 is fabricated is not critical. However, the material selected should have the following properties: (1) sufficient hardness that there will be no material cold flow; (2) a moderate amount of compressive strength; (3) sufficient resiliency to avoid scoring drive sleeve 40 and to absorb and dampen the vibration between sleeve 40 and movable sheave half 44; (4) a sufficiently low coefficient of friction that the sliding movement of movable sheave half 44 relative to drive sleeve 40 will not be impeded or hindered; (5) sufficient wear resistance with the material from which drive sleeve 40 is fabricated to insure an adequate useful life; (6) high resistance to oil and the other lubricants which are normally used in the types of mechanisms in which the present invention is intended to be incorporated; and (7) adequate thermal resistance to preclude damage from the heat generated by operation of the mechanism in which it is employed. Exemplary materials having the foregoing characteristics which have been found suitable for the intended use described above include the synthetic polymers known commercially as nylon and Teflon.

It is not critical that vibration absorbing insert 56 be formed as a member separate from setscrew 58. The desired results may also be achieved by increasing the length of setscrew 58 and providing a heavy coating of nylon, Teflon, or other equivalent material having the properties described above on its inner end. This modification is shown in FIGURE 4 in which the inner end of the lengthened setscrew, identified by reference character 58a, is surrounded by a coating 59 of material with the charactistics described above.

Split sheave pulley 34 includes a lower axially fixed sheave half 60. The hub 62 of the fixed sheave half rests upon a flange 64 integral with upper spindle portion 16 to which it is rotatively fixed by a key 66 projecting from its periphery and engaging a longitudinally extending keyway 68 formed in the interior wall of the bore of hub 62. The axially movable sheave half 70 is rotatively fixed to upper spindle portion 16 by a key 72 fixed to spindle portion 16 which engages a longitudinally extending keyway 74 in the bore of the hub 76 of sheave half 70.

The axially movable sheave halves 44 and 70 are connected for concomitant axial displacement by a bracket 78 mounted for rectilinear motion in a path parallel to the axes of output shaft 28 and spindle 14 on a cylindrical mounting pin or stud 80 fixed to the top of casting 12 by screws 82 with its axis parallel to the axes of the motor output shaft and spindle.

Bracket 78 embodies a pair of elongated side members 84 and 86 interconnected at their forward end by an inverted U-shaped bracket 88 and a reinforcing U-shaped bracket 90, adjacent their midpoints by a mounting bracket 92, and at their rearward end by an annular collar 94 fixed between the side members by mounting screws 96 and 98.

Collar 94 (see FIGURE 1) supports an anti-friction bearing such as ball bearing 100 with its inner race axially confined with respect to sheave half hub 50 by retainer rings 102 and 104. Movable sheave half 70 is rotatably suspended from bracket 88 by an anti-friction type bearing such as ball bearing 106 with its outer race retained against the upper end of sheave half hub 76 by an internally shouldered and threaded retainer ring 108 and its inner race supported upon a stub shaft 110 by retainer rings 112 and 114. Stub shaft 110 is suspended from bracket 82 by its threaded extension 116 which is secured to the bracket by opposed jam nuts 118 and 120.

Central bracket 92 has a vertically extending wall 122 lying parallel to the axis of pin 80 and top and bottom flanges 124 and 126 which are suitably apertured and support bearing bushings 128 and 130, respectively. Bearing bushings 128 and 130 are axially slidably received upon pin 80. Bracket 92 has forwardly extending side flanges 132 and 134 lying parallel to members 84 and 86 and is joined thereby by welding. Bracket 90 and 88 are welded to members 84 and 86 at their opposite ends to provide a rigid assembly.

Upward movement of bracket 78 along pin 80 lifts movable sheave halves 44 and 70, increasing the effective diameter of split sheave pulley 32 and reducing the effective diameter of split sheave pulley 34, and downward movement of bracket 78 produces the reverse effect.

The movement of bracket 78 is controlled by a hand wheel or crank 136 located at the front end of the drill press and journalled within a bore 138 in belt guard casting 140. Crank 136 is fixed by a shear pin 142 to a short shaft 144 journalled in bore 138 to prevent damage to the mechanism by attempted speed adjustment while motor 26 is "off". Shaft 144 is frictionally retained against rotation in bore 138 by a friction brake pad 146 pressed against its periphery by a screw 148 to prevent inadvertent or spindle load induced rotation of crank 136 or its shaft 144. Shaft 144 is connected to bracket 78 by a drive train (see FIGURE 2) comprising a pinion 150 fixed to shaft 144, a gear 152 in constant mesh with pinion 150 and mounted for rotation about the axis of a shaft 154 which is parallel to shaft 144, a pinion 156 mounted for rotation with gear 152, and a gear 158 in constant mesh with pinion 156 and mounted upon a shaft 160. Shaft 160 is journalled at one end within the coaxial end bore 162 (see FIGURE 1) in shaft 144 and, at the other end, in a bore 164 (FIGURE 2) formed in pin 80 and by a bracket 166 fixed to the top of casting 12 by screws 168. A pinion 170 is fixed to shaft 160 between bracket 166, which prevents deflection of shaft 160 upon loading of pinion 170, and pin 80. Pinion 170 is in constant mesh with a vertically extending rack 172 fixed to a bracket 174 by screws 176. Bracket 174 is fixed to the upstanding wall 122 of bracket 94 as by welding.

Rotation of crank 136 in a clockwise direction produces clockwise rotation of shaft 160 and elevates bracket 78, increasing the speed of the spindle; counterclockwise rotation of crank 136 lowers bracket 78, decreasing the spindle speed. In order to provide a direct reading indication of the selected spindle speed, a dial plate 178 is fixed to the front face of belt guard casting 140. Shafts 180 and 184 are drive connected by a chain and sprocket drive comprising a sprocket 186 fixed to shaft 160, chain 188, and a sprocket 190 fixed to shaft 184.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a variable speed V-belt transmission: a first rotary member; a second rotary member rotatable with and freely slidable on said first member; and means for eliminating chatter between said members without impeding sliding of the second member on the first comprising a solid vibration absorbing insert of material having a low coefficient of friction carried by one of said members and stop means carried by said one member biasing said insert into engagement with the other of said members.

2. The variable speed transmission as defined in claim 1, wherein said material is resilient.

3. The variable speed transmission as defined in claim 1, wherein said material is highly resistant to lubricants.

4. The variable speed transmission as defined in claim 1, wherein said material is resistant to deterioration in mechanical properties in the presence of temperatures substantially above room temperature.

5. The variable speed transmission as defined in claim 1, wherein said material is sufficiently hard to deterioration in mechanical properties to withstand cold flow and has a substantial amount of compressive strength.

6. In combination: a rotatable shaft; a first pulley half rotatively and axially fixed on said shaft; a second pulley half rotatively fixed on and freely slidable along said shaft; and means for eliminating chatter without impeding the sliding of said second pulley half on said shaft, comprising: an aperture in the hub of said second pulley half; a vibration absorbing insert having a low coefficient of friction and high resistance to cold flow in said aperture; and adjustable stop means operatively fixed to said hub biasing said insert into engagement with said shaft.

7. The combination as defined in claim 6, wherein said shaft is a driven shaft.

8. The combination as defined in claim 6, wherein said insert has substantially the same diameter as the aperture in said hub.

References Cited in the file of this patent

UNITED STATES PATENTS

| | | |
|---|---|---|
| 2,433,150 | Palm | Dec. 23, 1947 |
| 2,578,650 | Wright | Dec. 11, 1951 |
| 2,622,446 | Shaw | Dec. 23, 1952 |
| 2,677,149 | Fineran | May 4, 1954 |
| 2,800,800 | Dunn | July 30, 1957 |
| 2,883,875 | Davidson | Apr. 28, 1959 |
| 2,890,845 | Kiekhafer | June 16, 1959 |

UNITED STATES PATENT OFFICE
CERTIFICATE OF CORRECTION

Patent No. 3,156,127                        November 10, 1964

David D. Pettigrew

It is hereby certified that error appears in the above numbered patent requiring correction and that the said Letters Patent should read as corrected below.

Column 4, line 61, after "to" insert -- deterioration in mechanical properties in the presence of --; lines 67 and 68, strike out "to deterioration in mechanical properties to".

Signed and sealed this 30th day of March 1965.

(SEAL)
Attest:

ERNEST W. SWIDER                               EDWARD J. BRENNER
Attesting Officer                                     Commissioner of Patents